US009268458B1

(12) United States Patent
Siegel

(10) Patent No.: US 9,268,458 B1
(45) Date of Patent: Feb. 23, 2016

(54) GENERATING MEDIA TRIALS BASED UPON MEDIA CONSUMPTION

(75) Inventor: Hilliard Bruce Siegel, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 283 days.

(21) Appl. No.: 13/569,315

(22) Filed: Aug. 8, 2012

(51) Int. Cl.
*G06F 3/0481* (2013.01)

(52) U.S. Cl.
CPC ................................ *G06F 3/0481* (2013.01)

(58) Field of Classification Search
CPC .............................. G06F 3/04; G06F 3/0481
See application file for complete search history.

(56) References Cited

U.S. PATENT DOCUMENTS

| | | | |
|---|---|---|---|
| 6,519,412 B1* | 2/2003 | Kim | 386/261 |
| 8,332,425 B2* | 12/2012 | Svendsen et al. | 707/769 |
| 8,825,574 B2* | 9/2014 | Bodor | G06F 17/30017 706/18 |
| 2004/0036716 A1* | 2/2004 | Jordahl | G06F 17/30601 715/713 |
| 2005/0251807 A1* | 11/2005 | Weel | H04L 67/10 719/310 |
| 2007/0149116 A1* | 6/2007 | White | G06Q 30/0267 455/3.06 |
| 2008/0086379 A1* | 4/2008 | Dion | G06F 3/04842 705/14.1 |
| 2008/0147711 A1* | 6/2008 | Spiegelman | G06F 17/3002 1/1 |
| 2009/0018898 A1* | 1/2009 | Genen | 705/10 |
| 2009/0083116 A1* | 3/2009 | Svendsen | 705/10 |
| 2009/0271283 A1* | 10/2009 | Fosnacht et al. | 705/26 |
| 2010/0058485 A1* | 3/2010 | Gonzalez | 726/27 |
| 2010/0106730 A1* | 4/2010 | Aminian | G06Q 30/02 707/748 |
| 2010/0250336 A1* | 9/2010 | Selinger | G06Q 30/02 705/26.7 |
| 2011/0281538 A1* | 11/2011 | Morrison et al. | 455/185.1 |
| 2011/0295842 A1* | 12/2011 | King | G06F 17/30011 707/722 |
| 2012/0330734 A1* | 12/2012 | Brown et al. | 705/14.5 |

\* cited by examiner

*Primary Examiner* — Phenuel Salomon
(74) *Attorney, Agent, or Firm* — Thomas | Horstemeyer, LLP

(57) ABSTRACT

Disclosed are various embodiments for determining a foundational media item based at least upon an activity associated with a user. A related media item is identified based upon pre-defined relational metadata associated with the foundational media item. A recommendation is generated for the related media item that authorizes a presentation of the related media item through a user interface generated in a computing device.

18 Claims, 5 Drawing Sheets

GENERATING MEDIA TRIALS BASED UPON MEDIA CONSUMPTION

BACKGROUND

Identifying new media items likely to be enjoyed by a user may be difficult. Users typically resort to performing searches for media items based upon a set of search criteria from recent memory. However, the search criteria used may represent an incomplete description of the media preferences for a user. Furthermore, it may be difficult for a user to develop an appreciation for a media item based upon a sample of only a few seconds.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Various embodiments of the present disclosure relate to generating recommendations for trial presentations of remotely stored media items based upon historical media preference data associated with a user. The media preference data for a user may be based upon media items purchased by a user, searches performed for media items, media items played by the user, and/or other possible user activities associated with media items. In some embodiments, a given user may specify other users whose media preference data may be obtained and used as a basis for recommendations to the given user. From this media preference data, one or more "foundational" media items may be identified. In order to generate the recommendations for media items, the foundational media items may be correlated with pre-defined relation data in to determine other media items likely to be favored by the user. In some embodiments, a foundational media item may itself be recommended to the user if the foundational media item is not already possessed by the user.

The recommended media items may have one or more use restrictions such as, for example, restricting presentation of the media item to a fixed number of uses, restricting the length of time the media item may be played, restricting the client device through which the media item may be accessed, and/or other possible restrictions. In the following discussion, a general description of the system and its components are provided, followed by a discussion of the operation of the same.

Figure 1:
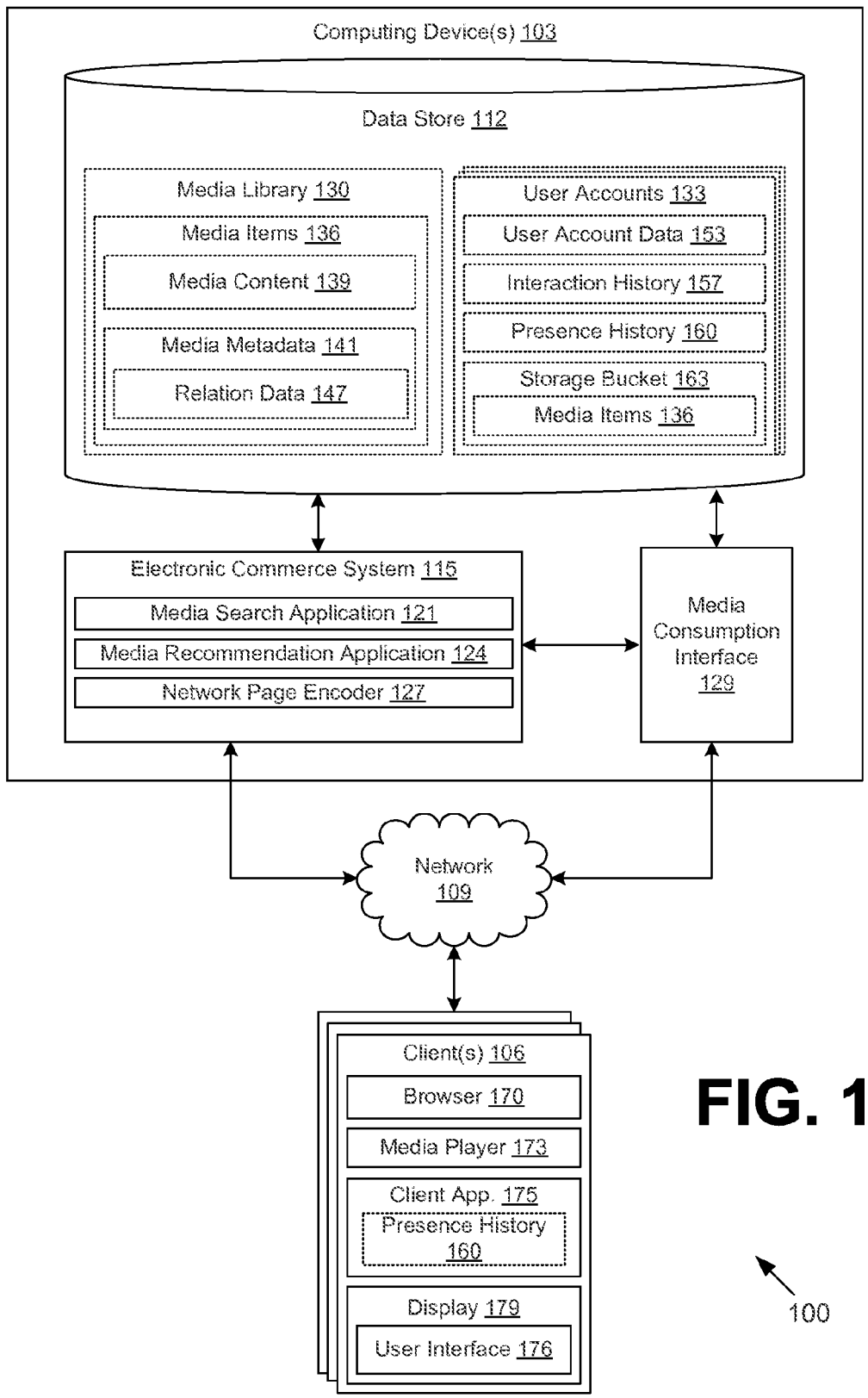
FIG. 1 is a drawing of networked environment according to various embodiments of the present disclosure.

With reference to FIG. 1, shown is a networked environment 100 according to various embodiments. The networked environment 100 includes a computing device 103, one or more clients 106, and a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 112 that is accessible to the computing device 103. The data store 112 may be representative of a plurality of data stores as can be appreciated. The data stored in the data store 112, for example, is associated with the operation of the various applications and/or functional entities described below.

The components executed on the computing device 103, for example, include an electronic commerce system 115, a media consumption interface 129, and other applications, services, processes, systems, engines, or functionality not discussed in detail herein. The electronic commerce system 115 may include various components, such as a media search application 121, a media recommendation application 124, a network page encoder 127, and other applications and/or processes.

The electronic commerce system 115 is executed in order to facilitate the online acquisition of media items over the network 109. The electronic commerce system 115 also performs various back-end functions associated with the online presence of a merchant in order to facilitate the online purchase of media items. For example, the electronic commerce system 115 may generate various network pages, using the network page encoder 127, such as web pages, or other types of network content that are provided to clients 106 for the purposes of selecting media items for purchase, rental, download, lease, or any other forms of consumption as can be appreciated. Alternatively, a mobile application may be executed in a client 106 to generate and render user interfaces using data served up by the computing device 103 and/or other servers. To this end, when rendered, network pages generate a user interface as can be appreciated.

The media consumption interface 129 is executed to serve up media items stored in the data store 112 to clients 106. The media consumption interface 129 may include a commercially available HTTP server such as, for example, Apache® HTTP Server, Apache® Tomcat®, Microsoft® Internet Information Services (IIS), etc. The media consumption interface 129 may generate one or more network pages, such as web pages, to facilitate selection and consumption of media items. In various embodiments, the media consumption interface 129 may serve up code that functions as an embedded audio player, video player, image viewer, etc. in order for the user to consume the media items. Multiple media consumption interfaces 129 may be provided for different platforms of clients 106. For example, one media consumption interface 129 may provide an interface for tablet computers, while another media consumption interface 129 may provide an interface for network-enabled televisions. In one embodiment, the media consumption interface 129 may facilitate consumption of media items through various other media channels and/or subscriptions.

The media search application 121 may be executed to encode, for rendering by the client 106, one or more search result network pages including a pool of media items in response to a search query. Lastly, the media recommendation application 124 is executed to generate one or more media item recommendations to present to the user based upon media preference data associated with the user.

The data stored in the data store 112 includes, for example, a media library 130 of media items, user accounts 133, and potentially other data. Each of the media items 136 may refer to a media product that may be offered for sale, purchase, rental, lease, and/or any other form of consumption and/or acquisition as may be appreciated. Associated with each of the media items 136 is media content 139, media metadata 141, and potentially other data. The media content 139 comprises, for example, audio content, video content, image content, electronic book content, interactive application content, and/or content associated with each of the media items 136 in the media library 130.

The media metadata 141 comprises data useful in searching media items 136, such as, for example, media titles, artist titles, media images, genre titles, album titles, media descriptions, media prices, media categories, and potentially other data. The media metadata 141 may also include preferences and statistics about each of the media items 136, such as, for example, customer reviews, customer ratings, statistics generated from server log data that indicate the number of downloads or previews (e.g., only the first minute of the media item was played out) associated with each of the media items 136, and potentially other data. The media metadata 141 may further include relation data 147 comprising identifiers for other media items 136 associated with a given media item 136 (e.g. a movie may be associated with a soundtrack to the movie and the book from which the movie may be based).

Associated with each user account 133 may be, for example, user account data 153, an interaction history 157, a presence history 160, a storage bucket 163, and potentially other data. The user account data 153 may include information about the user and their user account 133, such as, for example, name, address, email addresses, payment instruments, billing information, account settings, passwords, security credentials, user group membership, file management permissions, storage quotas and limitations, profile or demographic data associated with users, and/or other data. In some embodiments, the user account data 153 may further include identifiers for one or more other user accounts 133 whose media preference data is to be used as a basis for recommendations of media items 136. In other embodiments, the user account data 153 may further include permissions associated with the particular media preference data to be made available to other users and/or groups of users.

The interaction history 157 may include user-specific data related to a history of browsing and/or purchasing of media items 136 through the electronic commerce system 115, a history of searches for media items 136 through the electronic commerce system 115, a history of media items 136 played through the media consumption interface 129, a history of media items 136 stored in the storage bucket 163, reviews of media items 136 made by the user, and/or other possible data. The presence history 160 may include the media items 136 with which the user may be associated through his or her presence during performance of content associated with the media item 136. Each user account 133 also comprises a storage bucket 163 for the user to store one or more media items 136 either possessed by the user or purchased from the electronic commerce system 115 as will be described. Throughout this disclosure, the interaction history 157, the presence history 160, the contents of the storage bucket 163, the media metadata 141 from a given user, and potentially other data sources may collectively be referred to as media preference data.

The client 106 is representative of a plurality of client devices that may be coupled to the network 109. The client 106 may comprise, for example, a processor-based system such as a computer system. Such a computer system may be embodied in the form of a desktop computer, a laptop computer, a personal digital assistant, a cellular telephone, a smartphone, a set-top box, a music player, a web pad, a tablet computer system, a game console, an electronic book reader, or other devices with like capability.

The client 106 may be configured to execute various applications such as a browser 170, a media player 173, a client application 175 and/or other applications. The browser 170 may be executed in a client 106, for example, to access and render network pages, such as web pages, or other network content served up by the computing device 103 and/or other servers. When executed in a client 106, the browser 170 renders network pages on a user interface 176 of a respective display 179 and may perform other functions. The browser 170 accesses network pages, such as web pages or other types of content from the computing device 103 in order to access the functionality of the search application 121, the recommendation application 124, and other components implemented in the computing device 103 as will be described. Alternatively, a mobile application may be executed in a client 106 to generate and render a user interface 176 using data served up by the computing device 103 and/or other servers. To this end, when rendered, network pages generate a user interface 176 as can be appreciated.

The media player 173 is executed to play out media items 136 obtained through the media consumption interface 129 of the computing device 103. The media player 173 may be a stand-alone application, a plug-in for the browser 170, or other code included within a network page served up by the media consumption interface 129.

The client application 175 may be executed, with the permission of the user, in order to identify the media items 136 with which the user may be associated through his or her presence during performance of content associated with the media item 136. Identifiers for the associated media items 136 may be stored in the client 106 within the presence history 160, which may be transmitted to the data store 112. In some embodiments, the client application 175 may store the presence history 160 in a format that may later be correlated with media items 136 in the computing device 103 and/or other computing device. During execution, the client application 175 may use various sensor services such as, for example, a geolocation service, an acoustic fingerprinting service, an image recognition service, and/or sensor services as can be appreciated. The geolocation service may use global positioning system (GPS) receivers, cell network positioning, Wi-Fi™ positioning, near field communications (NFC), and/or other technologies as can be appreciated. The client 106 may be configured to execute applications beyond the browser 170, the media player 173, and the client application 175, such as, for example, email applications, instant message applications, and/or other applications.

Next, a general description of the operation of the various components of the networked environment 100 is provided. To begin, with permission of a user, various activities associated with a preference for media items 136 may be collected for the user. The electronic commerce system 115 may collect the interaction history 157 associated with the interactions of users with the media items 136 of the media library 130. For example, the interaction history 157 may capture the fact that the user has listened to audio samples from every album by the Beatles through the media consumption interface 129. Additionally, the interaction history 157 may also capture the fact that the user has twice paid to rent and watch the Beatles movie "A Hard Day's Night" through the media consumption interface 129.

In some embodiments, a client application 175 on the client 106 may, with permission of the user, detect the presence history 160 of the user at various performances of or associated with media content 139. The client application 175 may detect the presence of the user at the performances using a geolocation service, an acoustic fingerprinting service, an image recognition service, and/or sensor services as can be appreciated. As a non-limiting example, a geolocation service available to the client application 175 may periodically sample the location of the client 106. Given a location, the client application 175 may use local event schedules to determine concerts, book readings, plays, cinema screenings, and/or other performances that may be occurring near that location and time. Furthermore, using indoor mapping technology, the client application 175 may determine the particular theater of a multiplex cinema in which the client 106 is present.

As another example, an acoustic fingerprinting service available to the client application 175 may periodically sample the ambient sounds of the client 106. Using a sound sample, the client application 175 may identify a performance of a particular movie based on unique characteristics of the sound sample. In some embodiments, multiple sensor services may be used in tandem or in parallel in order to improve the identification of media content associated with the user. For example, if the client application 175 uses a geolocation service to detect a presence in a multiplex cinema where indoor mapping may not be available, the client application 175 may use the acoustic fingerprinting service to identify the particular movie at which the client 106, and inferentially the user, is present.

In some embodiments, the client application 175 may transmit, via the network 109, the raw sensing data collected by the client 106 to the computing device 103 or other computing device for later correlation with various media items 136. For example, rather than the client 106 determining nearby media-related events occurring at this time, the client application 175 may simply periodically transmit the location and time of the client 106 to the computing device 103 for later correlation with media events and media items 136.

In addition to collecting activities associated with the user for whom a related media item 136 may be recommended, the user may specify one or more other user accounts 133 from which preferences for media items 136 may be determined. For example, a given user may specify friends, family members, celebrities, and/or other users whose media preferences may be shared or appreciated by the user and from which recommendations for related media items 136 may be made to the user.

A user may choose to share all or a portion of their own interaction history 157, presence history 160, storage bucket 163 contents, and/or other possible sources of media preference data associated with media items 136. For example, the user may choose to share their interaction history 157 and storage bucket 163 content history, but not their presence history 160. In some embodiments, the users may define specific user accounts 133 or groups of users to share more, less, or different sources of information from which a preference for media items 136 may be ascertained. For example, a given user may specify that a user account 133 associated with a best friend may use any of the media preference data for the given user to make a recommendation, while no other user accounts 133 may use any of the media preference data for the given user. The various possible configurations associated with a user sharing their media preference data may be stored in the user account data 153 or elsewhere in the data store 112.

It should be noted that while a user may permit or deny use of their media preference information, the use may only constitute use of the information as a basis for recommendations of media items 136 for other users, not freely available direct access for those users. For example, if a user permits recommendations to be made based on their presence history 160, other users who are allowed access may not be able to determine the precise location of the user, sights and sounds that were captured, and/or other information from the presence history 160. Furthermore, use of the media preference data for another user account 133 may require both that a given user specify the other user account 133, and that the other user account 133 permit the given user access to the media preference data.

Upon obtaining various sources of media preference data, the media recommendation application 124 may provide recommended related media items 136 based upon the available media preference data. This portion of the execution of the media recommendation application 124 may be initiated based upon changes to the media presence data, a request by the user, a periodic schedule, and/or upon occurrence of other events.

In some embodiments, the media recommendation application 124 may correlate the "foundational" media items 136 identified within the various sources of media preference data with related media items 136 defined in the relation data 147. The related media items 136 may be in a different format type than the foundational media items 136 which serves as the basis for the recommendation. The various format types may include audio, video, electronic books, images, and/or other media formats as can be appreciated. For example, the interaction history 157 for a user may indicate a purchase of the movie "2001: A Space Odyssey." Based upon this foundational media item 136 for the movie, the relation data 147 may indicate that a related media item 136 is an electronic book also titled "2001: A Space Odyssey," as well as potentially many other media items 136 of varying relation to the foundational media item 136.

In other embodiments, the media recommendation application 124 may provide a recommendation to a user for the same media item 136 included within the preference data. Such a recommendation may be appropriate where the recommendation is based upon media preference data from other users, where the user has previously sampled the media item 136, and/or other possible scenarios.

Upon generating a recommendation for one or more media items 136, the media recommendation application 124 may authorize use of the media items 136 by the user or other recipient as facilitated by the media consumption interface 129. Presentation or other use of the recommended media items 136 may have various restrictions such as, for example, being limited to a pre-defined number of presentations, limited to a pre-defined time period, limited to presentation on one or more clients 106, and/or other possible use restrictions as can be appreciated. In some embodiments, the use restrictions for the recommended media items 136 may be modified based upon activities by the user receiving the recommendation and/or by other user accounts 133 specified by the user. For example, if a recommended media item 136 is a first one of a trilogy of albums by a music artist, the purchase of the second one of the trilogy of albums by the user may extend the available period of use for the first album.

Having authorized use of the related media item 136, the media recommendation application 124 may notify the user or other recipient of the recommendation. The recommendation may be delivered via a network page of the electronic commerce system 115, the media consumption interface 129, an email message, short message service/multimedia messaging service (SMS/MMS) message, and/or through other message delivery operations. Thereafter, the user may access the related media item 136 through media consumption interface 129 according to the restrictions associated with the related media item 136. In some embodiments, a related media item 136 having an expired period of use may still remain present, but in a disabled state within an interface generated by the media consumption interface 129. As described previously, actions by the recipient or other users specified by the recipient such as, for example, purchases made for media items 136 associated with an expired media item 136 may renew or otherwise modify the use restrictions of the expired media item 136. Furthermore, a negative review or rating of a particular recommended media item 136 by the user may remove the particular recommended media item 136 from the interface for the user and/or prevent future recommendations to user for the media item 136.

Figure 2:
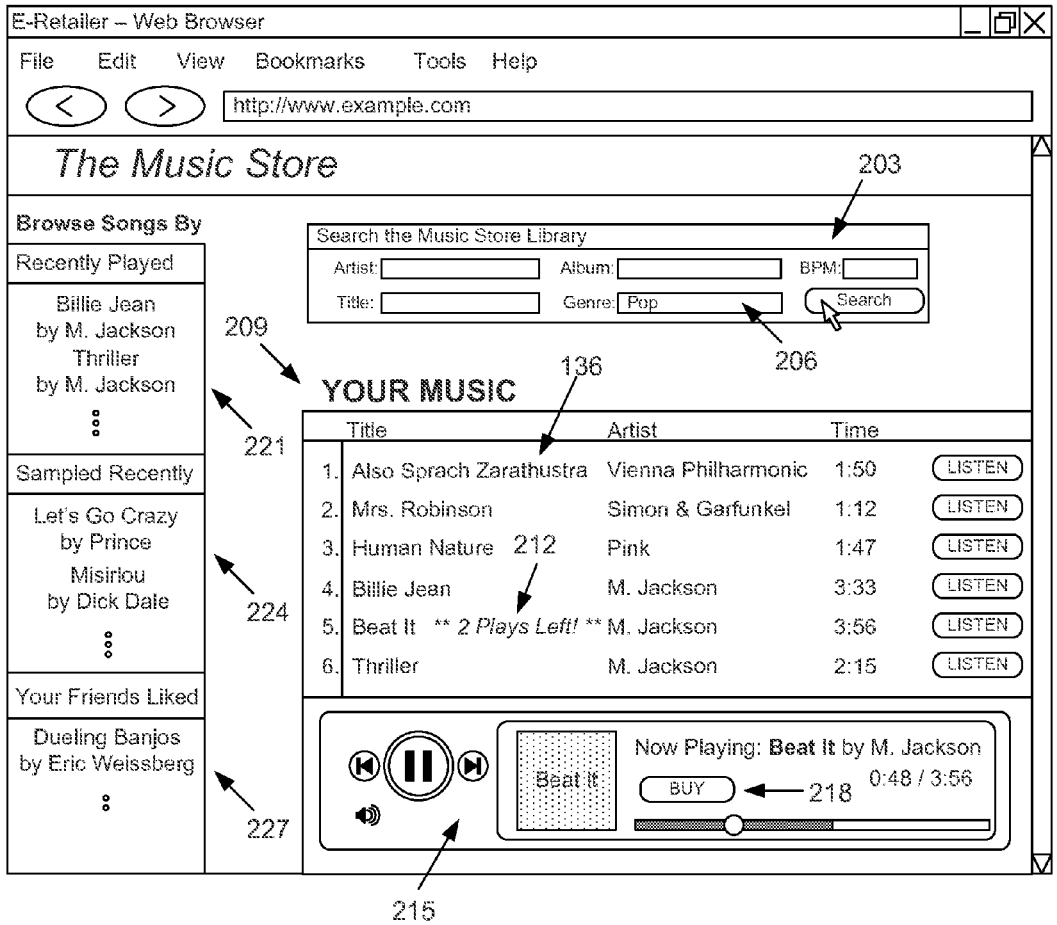
FIGS. 2 and 3 are drawings of example user interfaces rendered by a client in the networked environment of FIG. 1 according to various embodiments of the present disclosure.

Referring next to FIG. 2, shown is a non-limiting example of a user interface 176 (FIG. 1), denoted herein as user interface 176a generated by a media search application 121 (FIG. 1) and rendered by a browser 170 (FIG. 1) executed in a client 106 (FIG. 1) in the networked environment 100 (FIG. 1). Within the user interface 176a of FIG. 2, a search pane 203 may be included from which a user may search available media items 136 of the media library 130 (FIG. 1). In this example, the user has entered the search term "Pop" within a search query entry field 206 and is preparing to execute a search by clicking on the search button. It is understood, however, that a search query may be entered in a variety of ways such as, for example, by clicking on a link, by depressing a key on a keyboard, and/or by other methods. The operation of the search and the resulting user interface 176b will be described in FIG. 3.

The user interface 176a may further comprise a stored media pane 209. The media pane 209 may comprise the audio, video, electronic books, and/or other types of media items 136 that may be available within the data store 112 (FIG. 1) for presentation to the user. To this end, the media pane 209 may include media items 136 purchased by the user, uploaded by the user, recommended to the user, and/or from other possible sources. As described previously, the recommended media items 136 may include one or more usage restrictions. The usage restrictions associated with a recommended media item 136 may be displayed in a restriction pane 212.

The media pane 209 may further comprise a media player pane 215 generated by the media consumption interface 129. The media player pane 215 may provide an interface for a user to control presentation of the one or more media items 136 stored in the data store 112 that are available to the user. In the present example, the media item 136 being played is a track titled "Beat It," a recommended media item 136. As indicated in the restriction pane 212, this particular media item 136 has a restriction limiting it to two more plays before the present trial period expires. While playing a recommended media item 136, media player pane 215 may include a buy region 218 enabling a user to purchase the recommended media item 136. A purchase of the track may be recorded in the interaction history 157 (FIG. 1) associated with the particular user.

The user interface 176a may include a recently played pane 221 comprising one or more media items 136 recently played by the user through the media pane 209. The playback history of the various media items 136 for a user may be stored in the interaction history 157. Similarly, the user interface 176a may include a sampled recently pane 224 displaying the media items 136 recently sampled by a user as a result of, for example, a search for media items 136. Additionally, the user interface 176a may contain an associates pane 227 that may display media items 136 derived from media preference data of other users specified by a given user.

Figure 3:
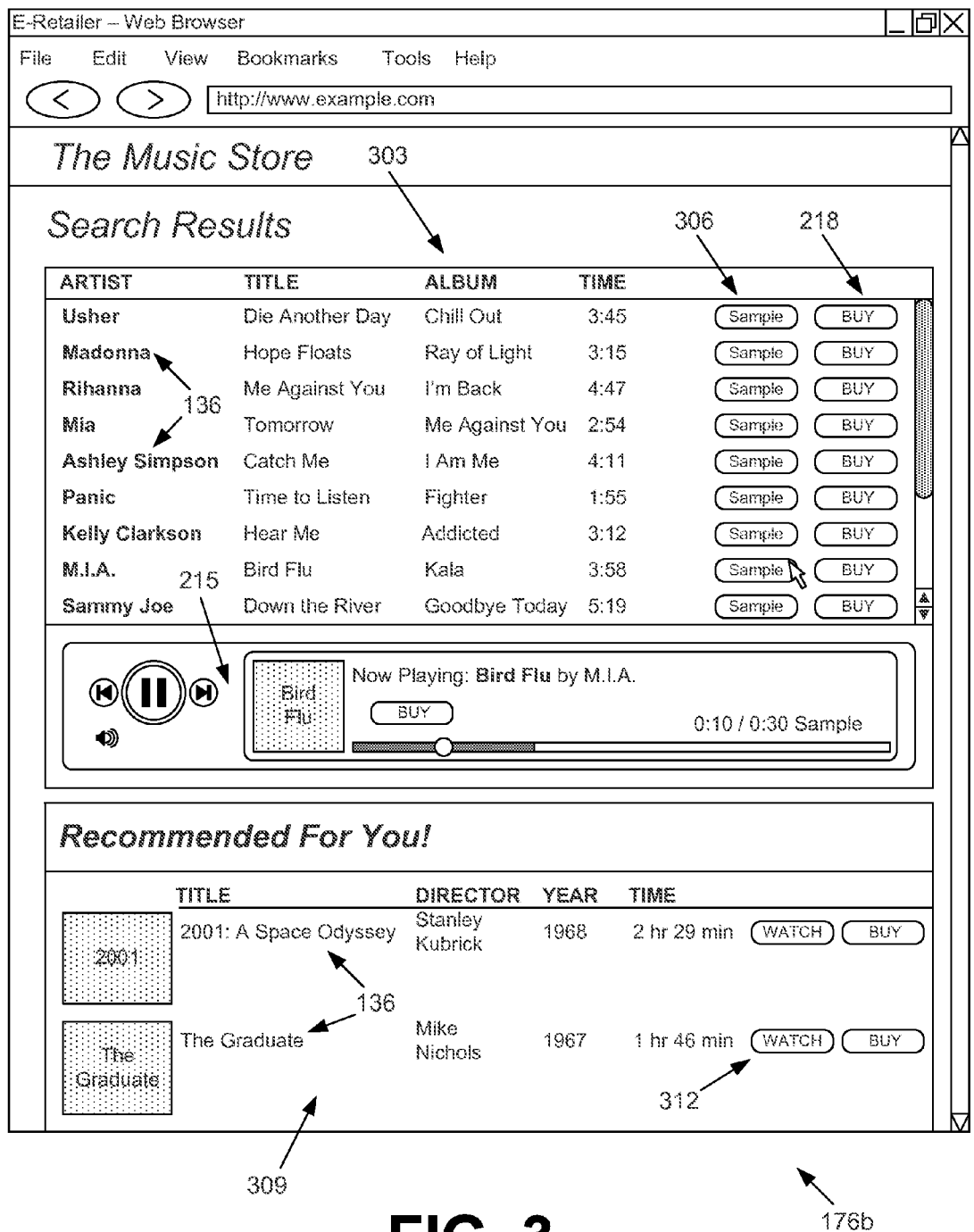

Moving on to FIG. 3, shown is a non-limiting example of a user interface 176 (FIG. 1), denoted herein as user interface 176b generated by a media search application 121 (FIG. 1) and rendered by a browser 170 (FIG. 1) executed in a client 106 (FIG. 1) in the networked environment 100 (FIG. 1). The user interface 176b may be generated as a result of the search performed in FIG. 2.

Within the user interface 176b of FIG. 3, a search results pane 303 may be included from which a user may identify the media items 136 available matching a previously executed search of the media library 130. In this example, various media metadata 141 (FIG. 1) associated with the media items 136 matching the search may be displayed. Additionally, each of the media items 136 may be presented with a buy region 218 permitting the user to purchase the corresponding media item 136. Each of the media items 136 of the search results pane 303 may further have a corresponding sample region 306. When activated by the user through the search pane 303, the sample region 306 may activate presentation of a sample of the associated media item through the media player pane 215. In the present example, the user has activated playback of a sample of a particular media item 136. The sample playback of this media item 136 may be stored in the interaction history 157 (FIG. 1) associated with the particular user.

The user interface 176b may also contain a recommendation pane 309 that provides a user with notice of recommended media items 136. As described previously, the recommended media items 136 may be recommended based upon media preference data of the given user, as well as media preference data associated with other users specified by the given user. In some embodiments, the recommendation pane 309 may further provide information as to the foundational media item or other media preference data that may serve as the basis for the recommended media items 136. For example, the recommendation pane 309 may include a notice that states "The Graduate was recommended because you listened to Mrs. Robinson by Simon & Garfunkel." The recommendation pane 309 may further contain a presentation region 312. When activated by the user, the presentation region may begin playing the corresponding media item 136 within the media player pane 215. In some embodiments, activating the presentation region 312 may further initiate placement of the corresponding media item 136 within the media pane 209 (FIG. 2).

Figure 4:
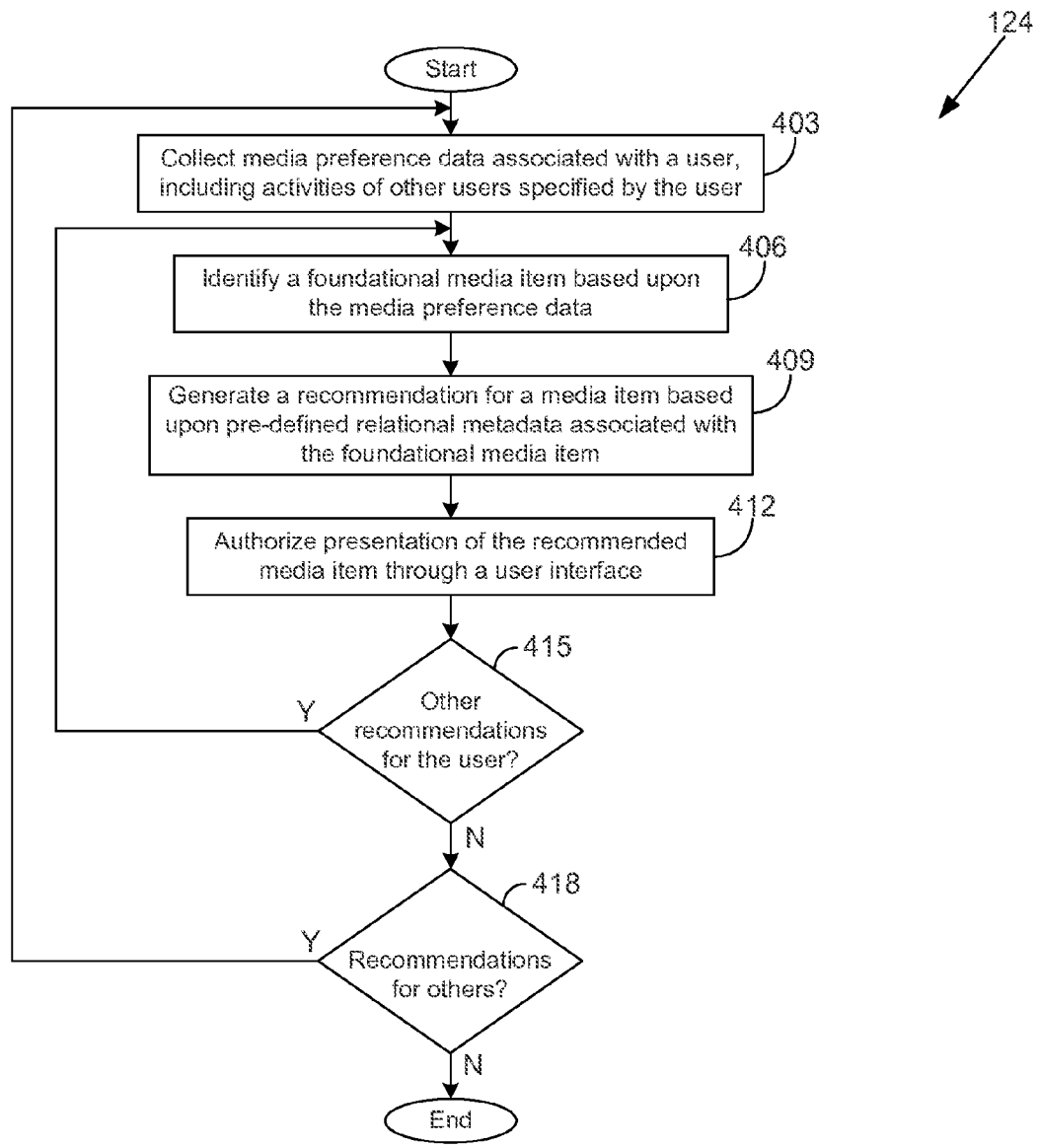
FIG. 4 is a flowchart illustrating an example of functionality implemented as portions of a media recommendation application executed in a computing device in the networked environment of FIG. 1 according to various embodiments of the present disclosure.

Turning now to FIG. 4, shown is a flowchart that provides one example of the operation of a portion of the media recommendation application 124 according to various embodiments. It is understood that the flowchart of FIG. 4 provides merely an example of the many different types of functional arrangements that may be employed to implement the operation of the portion of the media recommendation application 124 as described herein. As an alternative, the flowchart of FIG. 4 may be viewed as depicting an example of steps of a method implemented in the computing device 103 (FIG. 1) according to one or more embodiments.

The media recommendation application 124 may be executed in order to generate one or more recommended media items 136 (FIG. 1) based upon various media preference data previously collected. The media preference data may be that which is associated with the user, including the media preference data of the user, as well as media preference data of other user accounts 133 (FIG. 1) that may be specified by the user. This portion of the execution of the media recommendation application 124 may be initiated based upon changes to the media presence data, a request by the user, a periodic schedule, and/or upon occurrence of other events. To begin, in block 403, the media recommendation application 124 may obtain the various media preference data to be used to create a recommendation for a user. The various sources of media preference data for the user may be specified within the user account data 153 (FIG. 1) and may include, for example, the media metadata 141 (FIG. 1), interaction history 157 (FIG. 1), presence history 160 (FIG. 1), storage bucket 163 (FIG. 1) content history, and/or other sources of data for the user as well as other user accounts 133 specified by the user.

Next, in block 406, the media recommendation application 124 may identify one or more foundational media items 136 within the media preference data from which to make a recommendation. Then, in block 409, the media recommendation application 124 may generate a recommendation for one or more media items 136 based upon the foundational media items 136. In some embodiments, the media recommendation application 124 may correlate the foundational media items 136 identified within the various sources of media preference data with related media items 136 defined in the relation data 147 (FIG. 1). The related media items 136 may be in a different format type than the foundational media items 136 which serves as the basis for the recommendation. In other embodiments, the media recommendation application 124 may provide a recommendation to a user for the same media item 136 included within the media preference data. Such a recommendation may be appropriate when the recommendation is based upon media preference data from other users, from media items 136 sampled and not purchased by the user, and/or other possible scenarios.

Continuing, in block 412, the media recommendation application 124 may authorize use of the recommended media items 136 by the user or other recipient as facilitated by the media consumption interface 129 (FIG. 1). Presentation or other use of the recommended media items 136 may have various restrictions such as, for example, being limited to a pre-defined number of presentations, limited to a pre-defined time period, limited to presentation on one or more clients 106 (FIG. 1), and/or other possible use restrictions as can be appreciated.

Then, in block 415, the media recommendation application 124 determines whether additional recommendations for media items 136 are to be made for the given user. If more recommendations are to be made, execution of the media recommendation application 124 returns to block 406. Alternatively, if no additional recommendations are to be made at this time for the given user, in block 418, the media recommendation application 124 determines if additional recommendations should be made for other user accounts 133. If more recommendations are to be made for other user accounts 133, execution of the media recommendation application 124 returns to block 403. Alternatively, if no further recommendations are to be made, this portion of the execution of the media recommendation application 124 ends as shown. This portion of the execution of the media recommendation application 124 may be re-activated based upon changes to the media presence data, a request by a user, a periodic schedule, and/or upon occurrence of other events.

Figure 5:
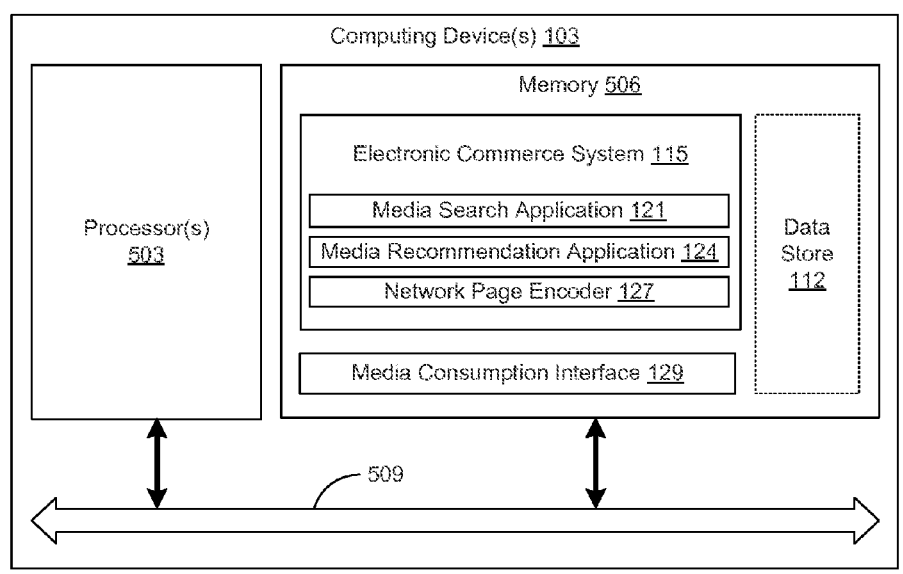
FIG. 5 is a schematic block diagram that provides one example illustration of a computing device employed in the networked environment of FIG. 1 according to various embodiments of the present disclosure.

With reference to FIG. 5, shown is a schematic block diagram of the computing device 103 according to an embodiment of the present disclosure. The computing device 103 includes a processor circuit, for example, having a processor 503 and a memory 506, both of which are coupled to a local interface 509. To this end, the computing device 103 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the media search application 121, the media recommendation application 124, the network page encoder 127, the media consumption interface 129, and potentially other applications. Also stored in the memory 506 may be a data store 112 and other data. In addition, an operating system may be stored in the memory 506 and executable by the processor 503.

It is understood that there may be other applications that are stored in the memory 506 and are executable by the processors 503 as can be appreciated. Where any component discussed herein is implemented in the form of software, any one of a number of programming languages may be employed such as, for example, C, C++, C#, OBJECTIVE C, JAVA, JAVASCRIPT, PERL, PHP, VISUAL BASIC, PYTHON, RUBY, DELPHI, FLASH, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and the memory 506 may represent multiple memories 506 that operate in parallel processing circuits, respectively. In such a case, the local interface 509 may be an appropriate network 109 (FIG. 1) that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the media search application 121, the media recommendation application 124, the network page encoder 127, the media consumption interface 129, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 4 shows the functionality and operation of an implementation of portions of the media recommendation application 124. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowchart of FIG. 4 shows a specific order of execution, it is understood that the order of execution may differ from that which is depicted. For example, the order of execution of two or more blocks may be scrambled relative to the order shown. Also, two or more blocks shown in succession in FIG. 4 may be executed concurrently or with partial concurrence. Further, in some embodiments, one or more of the blocks shown in FIG. 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the media search application 121, the media recommendation application 124, the network page encoder 127, and the media consumption interface 129, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
at least one computing device configured to perform operations comprising:
determine a foundational media item based at least upon an activity associated with a user, the foundational media item being of a first format type;
identify a related media item based upon pre-defined relational metadata associated with the foundational media item, the pre-defined relational metadata identifying the related media item as related to the foundational media item, the related media item being of a second format type;
generate a recommendation to the user for the related media item, wherein the recommendation authorizes a presentation of the related media item through a user interface generated in the at least one computing device, the presentation of the related media item having a usage restriction;
disable the presentation of the related media item according to the usage restriction; and
enable, after disabling the presentation of the related media item, the presentation of the related media item according to another activity associated with the user with respect to a media item distinct from the related media item; and wherein the activity further comprises a purchase history of a another user, the first user being associated with a pre-defined user list comprising the another user.

2. The system of claim 1, wherein the usage restriction is a limited number of presentations.

3. The system of claim 2, wherein after meeting the limited number of presentations, the related media item remains present in the user interface, the related media item being in a disabled state.

4. The system of claim 1, wherein the user interface facilitates purchasing the related media item.

5. The system of claim 1, wherein the activity further comprises a presence by the user at a public performance of content associated with the foundational media item.

6. The system of claim 5, wherein the presence is determined by a client application executed in a mobile computing device of the user.

7. The system of claim 6, wherein the client application uses a geolocation service.

8. The system of claim 6, wherein the content is identified using an acoustic fingerprinting service.

9. The system of claim 1, wherein the at least one computing device is further configured to perform operations comprising:

generate the user interface to present the related media item to the user; and transmit the user interface to a client computing device.

10. A method, comprising:

determining, in at least one computing device, a foundational media item based at least upon an activity associated with a first user;

identifying, in the at least one computing device, a related media item based upon pre-defined relational metadata associated with the foundational media item, the pre-defined relational metadata identifying the related media item as related to the foundational media item;

generating, in the at least one computing device, a recommendation for the related media item, wherein the recommendation authorizes a presentation of the related media item through a user interface generated in the at least one computing device, the presentation having a usage restriction;

disabling, in the at least one computing device, the presentation of the related media item according to the usage restriction;

enabling, in the at least one computing device, after disabling the presentation of the related media item, the presentation of the related media item according to another activity associated with the first user with respect to a media item distinct from the related media item; and wherein the activity further comprises a purchase history of a second user, the first user being associated with a pre-defined user list comprising the second user.

11. The method of claim 10, wherein the usage restriction is a time limit for the presentation.

12. The method of claim 10, wherein the pre-defined user list is obtained, via a network, from a data store located remote from the at least one computing device.

13. The method of claim 10, wherein the activity further comprises a presence by the second user at a performance of content associated with the foundational media item.

14. The method of claim 10, further comprising the steps of:

generating, in the at least one computing device, the user interface to present the related media item to the first user; and transmitting, in the at least one computing device, data encoding the user interface to a client computing device.

15. The method of claim 14, wherein the user interface facilitates acquiring rights to the related media item.

16. The method of claim 10, wherein the usage restriction comprises a predefined number of playbacks.

17. A non-transitory computer-readable medium embodying a program executable in a computing device, the program, when executed, causing the computing device to perform operations comprising:

determine a foundational media item based at least upon an activity associated with a first user, the foundational media item being of a first format type selected from the group consisting of audio, video, and electronic book;

identify a related media item based at least upon pre-defined relational metadata associated with the foundational media item, the pre-defined relational metadata identifying the related media item as related to the foundational media item, the related media item being of a second format type, the second format type being a different format type than the first format type;

generate a recommendation to the first user for the related media item, wherein the recommendation authorizes a presentation of the related media item through a user interface, the presentation having a usage restriction comprising being limited to a pre-defined length of time;

disable the presentation of the related media item according to the usage restriction;

enable, after disabling the presentation of the related media item, the presentation of the related media item according to another activity associated with the first user with respect to a media item distinct from the related media item;

generate the user interface to present the related media item to the first user;

transmit, via a network, data encoding the user interface to a client computing device; and wherein the activity further comprises a purchase history of a second user, the first user being associated with a pre-defined user list comprising the second user.

18. The non-transitory computer-readable medium of claim 17, wherein the activity comprises a browsing history of the first user.

* * * * *